US011520428B2

(12) United States Patent
Thorsell et al.

(10) Patent No.: US 11,520,428 B2
(45) Date of Patent: Dec. 6, 2022

(54) FINGER-POSITION SENSITIVE HUMAN MACHINE INTERFACE FOR HANDLING A USER INPUT OF A USER AND A METHOD FOR HANDLING A USER INPUT OF A USER OF A FINGER-POSITION SENSITIVE HUMAN MACHINE INTERFACE

(71) Applicant: Volvo Truck Corporation, Gothenburg (SE)

(72) Inventors: Jonas Thorsell, Gothenburg (SE); Jan Svensson, Kungälv (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/290,791

(22) PCT Filed: Oct. 28, 2019

(86) PCT No.: PCT/EP2019/079406
§ 371 (c)(1),
(2) Date: May 3, 2021

(87) PCT Pub. No.: WO2020/094444
PCT Pub. Date: May 14, 2020

(65) Prior Publication Data
US 2022/0004278 A1 Jan. 6, 2022

(30) Foreign Application Priority Data

Nov. 6, 2018 (WO) ................. PCT/EP2018/080310

(51) Int. Cl.
*G06F 3/041* (2006.01)
*G06F 3/042* (2006.01)

(52) U.S. Cl.
CPC .......... *G06F 3/0414* (2013.01); *G06F 3/0425* (2013.01); *G06F 2203/04104* (2013.01); *G06F 2203/04106* (2013.01)

(58) Field of Classification Search
CPC .. G06F 3/0425; G06F 3/0414; G06F 3/04886; G06F 2203/04105; G06F 2203/04106; G06F 2203/04104
See application file for complete search history.

(56) References Cited

U.S. PATENT DOCUMENTS

2016/0188181 A1 6/2016 Smith
2017/0285858 A1 10/2017 Kursula et al.
(Continued)

FOREIGN PATENT DOCUMENTS

WO 2017175035 A1 2/2019

OTHER PUBLICATIONS

International Search Report and Written Opinion of the International Searching Authority, PCT/EP2018/080310, dated Jul. 11, 2019, 12 pages.
(Continued)

*Primary Examiner* — Dennis P Joseph
(74) *Attorney, Agent, or Firm* — Sage Patent Group

(57) ABSTRACT

A finger position sensitive HMI for handling a user input of a user. The HMI includes an EDPU and includes a finger-position sensitive display. The display is arranged to display a generated button at the generated display location, to detect touch coordinates of a touched location on the display to provide the detected touch coordinates to the HMI OS, and to detect a force signal caused by pressure being applied to the display. The display is further arranged to provide the detected force signal to a supervising element. A check unit connected to the supervising element is arranged to observe a displayed button, and to generate an observed button
(Continued)

bitmap content indicator of a pixel area related to the observed displayed button. The supervising element is arranged to release the provided service request related to the displayed button.

25 Claims, 4 Drawing Sheets

(56) References Cited

U.S. PATENT DOCUMENTS

| | | |
|---|---|---|
| 2018/0180169 A1* | 6/2018 | Lee ..................... F16H 59/0217 |
| 2019/0102031 A1* | 4/2019 | Shutzberg ............. G06F 3/0414 |
| 2019/0114004 A1 | 4/2019 | Lee et al. |
| 2021/0248981 A1* | 8/2021 | Chen ................. H04M 1/72448 |

OTHER PUBLICATIONS

International Search Report and Written Opinion of the International Searching Authority, PCT/EP2019/079406, dated Dec. 11, 2019, 13 pages.

* cited by examiner

FINGER-POSITION SENSITIVE HUMAN MACHINE INTERFACE FOR HANDLING A USER INPUT OF A USER AND A METHOD FOR HANDLING A USER INPUT OF A USER OF A FINGER-POSITION SENSITIVE HUMAN MACHINE INTERFACE

CROSS REFERENCE TO RELATED APPLICATIONS

This application is a 35 U.S.C. § 371 national stage application of PCT International Application No. PCT/EP2019/079406 filed on Oct. 28, 2019, which itself claims priority to PCT International Application No. PCT/EP2018/080310, filed on Nov. 6, 2018, the disclosures and content of which are incorporated by reference herein in their entirety.

TECHNICAL FIELD

The invention relates to a finger-position sensitive Human Machine Interface for handling a user input of a user and to a method for handling a user input of a user of a finger-position sensitive Human Machine Interface.

The invention is applicable on all kind of vehicles, for example on trucks, buses, passenger cars, and also on working machines within the fields of industrial construction machines or construction equipment, for example tippers.

Although the invention will be described with respect to a working machine in the form of a tipper, the invention is not restricted to this particular machine, but may also be used in other working machines such as cranes, excavators, wheel loaders and backhoe loaders.

In the following the term "Human Machine Interface" is abbreviated by the term "HMI", the term "Electronic Data Processing Unit" is abbreviated by the term "EDPU", the term "Operating System" is abbreviated by the term "OS", the term "Components Off The Shelf" is abbreviated by the term "COTS".

BACKGROUND

An electronic device comprising a pressure sensitive display is known from US 2017/0285858 A1. The electronic device according to US 2017/0285858 A1 comprises a processor and a memory including an OS for managing operations of the electronic device. The OS is embodied as an UNIX OS or as a another COTS OS. The display according to US 2017/0285858 A1 comprises a first cover member coupled to a second cover member to define a first chamber, a fluid disposed in the first chamber, and a pressure sensor coupled to the chamber to detect a change in pressure in the fluid disposed in the first chamber. The pressure sensor is communicatively coupled to a printed circuit board, providing communication connections to a controller of the electronic device. The controller comprises a display manager and a local memory. The display manager is coupled to the pressure sensor and a fluid pump coupled to the display. The display manager is coupled to a graphics processor and a touch controller for the display. The graphics processor manages graphics operations on the display and the touch controller manages touch based operations on the display. A location sensor from a touch screen system provides information about the location of a touch on the display to the display manager and the touch controller. The touch screen system comprises a capacitive touchscreen and a grid of location sensors to determine the location of the touch on the touchscreen. The local memory comprises one or more bitmap tables which comprise bitmaps for images presented on display. The graphics processor generates bitmaps corresponding to images presented on display. The bitmaps may include coordinates of input/output devices, e.g., buttons, text boxes, or the like on the display.

At operation, the display manager receives inputs from the pressure sensor and the touch controller, and combines the inputs to facilitate distinguishing a deliberate input touch from a user from an accidental touch by a user or by an object. The display manager tracks the pressure of the fluid in the chamber over time. If multiple fingers press the display at exactly the same time, they cause a single pressure increase peak in the fluid in the chamber and the pressure peak may be greater than a press from a single finger. If multiple fingers touch the display at slightly different time, they will generate multiple pressure changes. Timing of those pressure changes are combined with touch location sensor information to define the location and force of finger touches. A pressure spike which remains above a threshold value for a predetermined period of time indicates that a deliberate touch was applied to the display and should be processed as an input to the display. A pressure spike that remains above the threshold for less than the predetermined time period may indicated an accidental touch on the touch screen. Information from the pressure sensor is combined with information from the touch controller to distinguish between deliberate touches and accidental touches.

However, the controller of electronic devices is susceptible for software bugs and/or for electromagnetic fields, both possibly causing malfunction. Therefore the controller is not sufficiently reliable for safety-related commands. A safety-related command is a command where a human being can be injured in case the safety-related command is erroneously released by malfunction. Also US 2016/18818 A1 and WO 2017/175035 disclose pressure sensitive displays.

SUMMARY

An object of the invention is to provide a finger-position sensitive HMI for handling a user input of a user and to a method for handling a user input of a user of a finger-position sensitive HMI, which provides usability of a finger-position sensitive display of a finger-position sensitive HMI also for safety-related commands.

According to a first aspect of the invention, the object is achieved by a finger-position sensitive HMI for handling a user input of a user according to claim 1. The finger-position sensitive HMI comprises an EDPU arranged to run an HMI OS and comprises a finger-position sensitive display connected to the EDPU. The HMI OS is arranged to generate a button and a display location for the button on the display, and to request the display to display the button at the generated display location. The display is arranged to display the generated button at the generated display location, to detect touch coordinates of a touched location on the display, to provide the detected touch coordinates to the HMI OS, and to detect a force signal caused by pressure being applied to the display. The finger-position sensitive HMI is characterized in that the display is connected to a supervising element and is further arranged to provide the detected force signal to the supervising element. The EDPU is connected to the supervising element. The HMI OS is further arranged to generate a service request related to the displayed button and to provide the service request to the supervising element, if the condition is fulfilled that the detected touch coordinates fit to the generated display location, and to provide a source button bitmap content indicator of a bitmap of the button that was requested to be displayed at the generated display location, to the supervising element. The HMI comprises a check unit. The check unit is connected to the supervising element and is arranged to observe a displayed button at the generated display location, to generate an observed button bitmap content indicator of a pixel area related to the observed displayed button, and to provide the observed button bitmap content indicator to the supervising element. The supervising element is arranged to release the provided service request related to the displayed button, if the conditions are fulfilled that the detected force signal, provided to the supervising element, indicates that at least a predefined amount of pressure has been applied to the display, and that a comparison of the provided observed button bitmap content indicator with the provided source button bitmap content indicator indicates that the provided service request is valid.

In the present application, finger-position sensitive HMI means that the HMI is sensitive for a position of a finger with respect to the HMI. In the present application, finger-position sensitive display means that the display is sensitive for a position of a finger with respect to the display.

In the present application, a button may be any kind of icon or symbol which can be visibly displayed on a display. In the present application, a button bitmap content indicator may be any kind of indicator, for example one or more numbers, which indicator indicates one or more characteristics of a content of a bitmap of a button. A preferred such indicator is providing a unique, for all practical purposes, characteristic that has very low probability of occurring somewhere else. In the present application, detected touch coordinates may be x-y-coordinates in a plane, or may by x-y-z-coordinates in space. In the present application, the generated display location may be x-y-coordinates and/or a range of x-y-coordinates in a plane, or may by x-y-z-coordinates and/or a range of x-y-z-coordinates in space. In the present application, a service request related to the displayed button may be any kind of request, for example a request to tilt a container of a tipper to release the load out of the container.

By the provision of a finger-position sensitive HMI for handling a user input of a user which HMI is characterized in that the display is connected to a supervising element and is further arranged to provide the detected force signal to the supervising element, that the EDPU is connected to the supervising element, that the HMI OS is further arranged to generate a service request related to the displayed button and to provide the service request to the supervising element, if the condition is fulfilled that the detected touch coordinates fit to the generated display location, and to provide a source button bitmap content indicator of a bitmap of the button that was requested to be displayed at the generated display location, to the supervising element, and which HMI is further characterized by a check unit which is connected to the supervising element and is arranged to observe a displayed button at the generated display location, to generate an observed button bitmap content indicator of a pixel area related to the observed displayed button, and to provide the observed button bitmap content indicator to the supervising element, and which HMI is further characterized in that the supervising element is arranged to release the provided service request related to the displayed button, if the conditions are fulfilled that the detected force signal, provided to the supervising element, indicates that at least a predefined amount of pressure has been applied to the display, and that a comparison of the provided observed button bitmap content indicator with the provided source button bitmap content indicator indicates that the provided service request is valid, it is provided the advantage to substantially avoid unwanted activations, for example by electromagnetic fields, of a service request related to a button displayed on the finger-position sensitive display of the HMI. Therefore, according to the present invention, a service request related to a button displayed on the finger-position sensitive display of the HMI is sufficiently reliable for safety-related requests. Accordingly, the present invention provides usability of a finger-position sensitive display of a finger-position sensitive HMI also for safety-related commands.

The present invention comprises the perception that even if the prior art electronic device uses a touch sensor and a pressure sensor to distinguish between deliberate touches and accidental touches, the prior art electronic device is still only one electronic element being susceptible for software bugs and/or for electromagnetic fields possibly causing malfunction of the processor. Prior art electronic devices are also usually complex and are containing a software system, which is usually also complex to determine that it is fault free in all circumstances. In summary, the prior art solutions are not sufficiently reliable for safety-related commands.

In addition, the present invention comprises the perception that this weakness of known systems can be compensated by introducing a second or supervising element which is arranged to release a provided service request related to a displayed button, if the conditions are fulfilled that a detected force signal, provided to such supervising element, indicates that at least a predefined amount of pressure has been applied to a display of the HMI, and that a comparison of a button bitmap content indicator, observed and provided by an additional check unit, with a source button bitmap content indicator, provided by an EDPU of the HMI, indicates that the provided service request is valid.

The EDPU of the present invention can be any electronic processor, circuit board, and/or computer. The OS of the present invention can be any OS, in particular any known COTS OS, such as Android, Windows, iOS, macOS, etc.

According to one embodiment, the detected force signal is provided to the HMI OS, also, and the HMI OS being further arranged to generate the service request related to the displayed button and to provide the service request to the supervising element, if the following condition is also fulfilled: the detected force signal, provided to the HMI OS, indicates that at least a predefined amount of pressure has been applied to the display. Hereby it is provided an improvement of having a second channel or element, the supervising element, by providing the detected force signal not only to the supervising element but also to the HMI OS, and by having the HMI OS further arranged to generate the service request related to the displayed button and to provide the service request to the supervising element, if the detected force signal, provided to the HMI OS, indicates that at least a predefined amount of pressure has been applied to the display. Thereby, it is provided the advantage that unwanted activations, for example by electromagnetic fields, of a service request related to a button displayed on the finger-position sensitive display of the HMI, are further reduced and can therefore be substantially avoided. Accordingly, this embodiment further improves the usability of a finger-position sensitive display of a finger-position sensitive HMI for safety-related commands.

According to a further embodiment, the display being arranged to provide the detected force signal to the supervising element through a channel being, preferably operably and/or physically, independent from the HMI OS. By providing the detected force signal to the supervising element through a channel being independent from the HMI OS, any unwanted impact on the reliability of the HMI OS, e.g. by a malware, has no impact on the detected force signal being provided to the supervising element. Thereby, it is provided the advantage that unwanted activations, for example by electromagnetic fields, of a service request related to a button displayed on the finger-position sensitive display of the HMI, are even further reduced. Accordingly, this embodiment further improves the usability of a finger-position sensitive display of a finger-position sensitive HMI for safety-related commands.

According to a further embodiment, the detected force signal, provided to the supervising element, is a first force signal, and wherein the display being further arranged to detect a second force signal caused by, e.g. the same, pressure being applied to the display, and wherein the detected second force signal is provided to the HMI OS, and the HMI OS being further arranged to generate the service request related to the displayed button and to provide the service request to the supervising element, if the condition is also fulfilled that the detected second force signal, provided to the HMI OS, indicates that at least a predefined amount of pressure has been applied to the display. Hereby it is provided a further improvement of the advantageous aspect of having a second channel or element, the supervising element, by, on the one hand, having a first and a second detected force signal, and by, on the other hand, providing the first detected force signal, preferably only, to the supervising element, and by providing the second detected force signal, preferably only, to the HMI OS. By arranging the display to detect a first and a second force signal caused by, e.g. the same, pressure being applied to the display, any unwanted impact on the second force signal provided to the HMI OS, e.g. by an electromagnetic field, has no impact on the first detected force signal being provided to the supervising element, and vice versa. Thereby, it is provided the advantage that unwanted activations, for example by electromagnetic fields, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment, the display being arranged to provide the detected first force signal to the supervising element through a first channel, and to provide the detected second force signal to the HMI OS through a second channel, preferably first and second channel being operably and/or physically independent from each other. By arranging the display to provide the detected first force signal to the supervising element through a first channel, and to provide the detected second force signal to the HMI OS through a second channel, any unwanted impact on the first channel, e.g. by an electromagnetic field, has no impact on the second channel. Thereby, it is provided the advantage that unwanted activations, for example by electromagnetic fields, of a service request related to a button displayed on the finger-position sensitive display of the HMI, are even further reduced. Accordingly, this embodiment even further improves the use usability ability of a finger-position sensitive display of a finger-position sensitive HMI for safety-related commands.

According to a further embodiment, the supervising element comprises an operably and/or physically independent further EDPU. By using a further EDPU for the supervising element, the further EDPU being operably and/or physically independent form the EDPU normally running the HMI OS, any unwanted impact, e.g. by a malware or an electromagnetic field, on the EDPU running the HMI OS, has no impact on the EDPU of the supervising element. Thereby, it is provided the advantage that unwanted activations, for example by a malware or an electromagnetic field, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment, the supervising element comprises an operably and/or physically independent further OS. By using a further OS for the supervising element, the further OS being operably and/or physically independent from the HMI OS, any unwanted impact, e.g. by a malware, on the HMI OS, has no impact on the OS of the supervising element. Thereby, it is provided the advantage that unwanted activations, for example by a malware, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment, the finger-position sensitive display comprises a vehicle mounted display of an Electronic Control Unit (in the following: ECU) of a vehicle, such as a tipper. Hereby a useful implementation of the present invention is provided. The finger-position sensitive HMI and/or display can be permanently installed in a vehicle, or can be a separate unit, like a portable equipment.

According to a further embodiment, the source button bitmap content indicator comprises a source Cyclic Redundancy Check (in the following: CRC) value computed on the basis of a source bitmap of a button that was requested to be displayed at the generated display location. By using a source button bitmap content indicator comprising a CRC value computed on the basis of a source bitmap of a button that was requested to be displayed at the generated display location, an unwanted impact, e.g. by a malware or an electromagnetic field, on a result of the comparison of the observed button bitmap content indicator with the source button bitmap content indicator can be excluded. Thereby, it is provided the advantage that unwanted activations, for example by a malware or an electromagnetic field, of a service request related to a button displayed on the finger-position sensitive display of the HMI, are even further reduced. Accordingly, this embodiment even further improves the usability of a finger-position sensitive display of a finger-position sensitive HMI for safety-related commands.

According to the invention, the observed button bitmap content indicator comprises a Display Content Integrity Checker (in the following: DCIC), such as a observed CRC value, of a pixel area covering the observed displayed button. By using an observed button bitmap content indicator comprising a checksum like a DCIC of a pixel area related to the observed displayed button, an unwanted impact, e.g. by a malware or an electromagnetic field, on a result of the comparison of the observed button bitmap content indicator with the source button bitmap content indicator can be excluded. Thereby, it is provided the advantage that unwanted activations, for example by a malware or an electromagnetic field, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment, the display is arranged to detect touch coordinates of a touched location on the display by comprising a touch sensitive surface detecting a physical touch of a finger. Hereby a simple, reliable and cost-efficient implementation of the present invention is provided.

According to a further embodiment, the display is arranged to detect touch coordinates of a touched location on the display by comprising an optical grid over the display, the optical grid detecting a finger location on a surface of the display. Hereby a reliable and cost-efficient implementation of the present invention is provided.

According to a further embodiment, the display is arranged to detect touch coordinates of a touched location on the display by comprising a camera, detecting a finger location on a surface of the display. Hereby a reliable and cost-efficient implementation of the present invention is provided.

According to a further embodiment, the check unit being arranged, for example by being, preferably, physically connected to a, preferably physical distinct, line carrying a video stream from the HMI OS to the display, to observe a displayed button at the generated display location by extracting video data from the generated output video stream carried by the line on its way from the HMI OS to the display and/or by extracting video data from the generated output video stream at an input of the display. By extracting video data from a generated output video stream on its way to the display and/or by extracting video data at an input of the display, it is possible to directly observe video data of a video stream of a button on its way to the display. Therefore, a reliable and cost-efficient implementation of the present invention is provided. Accordingly, this embodiment even further improves the usability of a finger-position sensitive display of a finger-position sensitive HMI for safety-related commands.

According to a further embodiment, the HMI is comprising a memory being connected to the EDPU, the memory having stored a graphical resource file containing a bitmap and button coordinates for the button to be generated by the HMI OS, the display being further arranged to provide the detected touch coordinates to the supervising element, the HMI OS being further arranged to provide the graphical resource file both to the EPDU for generating the button, and to the supervising element, the supervising element being further arranged to release the provided service request related to the displayed button, if the following conditions are also fulfilled: a comparison of the provided observed button bitmap content indicator with a reference button bitmap content indicator of the received graphical resource file indicates that the provided service request is valid, and a comparison of the provided coordinates of the button with the button coordinates contained in the received graphical resource file indicates that the provided service request is valid. The reference button bitmap content indicator preferably comprising a reference CRC value. Preferably the display being arranged to provide the detected touch coordinates to the supervising element through a channel being, preferably operably and/or physically, independent from the HMI OS. The present embodiment further improves the HMI of the present invention since it provides the possibility to detect certain errors that may be generated within the HMI that embodiments without the additional mechanism of this embodiment may not detect.

According to a further embodiment, the supervising element being further arranged to provide a reference time and/or a time stamp to the HMI OS, the HMI OS being further arranged to provide the reference time and/or the time stamp to the generated button to be displayed at the generated display location, the check unit being further arranged to observe an observed reference time and/or an observed time stamp of the observed displayed button and to provide the observed reference time and/or observed time stamp to the supervising element, and the supervising element being further arranged to release the provided service request related to the displayed button, if the following condition is also fulfilled: a comparison of the reference time and/or time stamp provided to the HMI OS with the observed reference time and/or observed time stamp indicates that the provided service request is valid. The present embodiment further improves the HMI of the present invention since it provides the possibility to detect certain errors that may be generated within the HMI that embodiments without the additional mechanism of this embodiment may not detect.

According to a second aspect of the invention, the object is achieved by a method for handling a user input of a user of a finger-position sensitive HMI according to claim 12. The finger-position sensitive HMI comprising an EDPU arranged to run an HMI OS and comprising a finger-position sensitive display connected to the EDPU. The method comprises the step of generating a button. The method further comprises the step of generating a display location for the button on the display. The method further comprises the step of requesting the display to display the button at the generated display location. The method further comprises the step of displaying the generated button on the display at the generated display location. The method further comprises the step of detecting touch coordinates of a touched location on the finger-position sensitive display. The method further comprises the step of providing the detected touch coordinates to the HMI OS. The method further comprises the step of detecting a force signal caused by pressure being applied to the display. The method further comprises the step of providing the detected force signal to a supervising element. The method further comprises the step of the HMI OS generating a service request related to the displayed button and providing the service request to the supervising element, if the condition is fulfilled that the detected touch coordinates fit to the generated display location. The method further comprises the step of observing a displayed button at the generated display location. The method further comprises the step of generating an observed button bitmap content indicator of a pixel area related to the observed displayed button. The method further comprises the step of providing the observed button bitmap content indicator to the supervising element. The method further comprises the step of the HMI OS providing a source button bitmap content indicator of a bitmap of a button that was requested to be displayed at the generated display location, to the supervising element. The method further comprises the step of the supervising element releasing the provided service request related to the displayed button, if the conditions are fulfilled that the detected force signal, provided to the supervising element, indicates that at least a predefined amount of pressure has been applied to the display, and that a comparison of the provided observed button bitmap content indicator with the provided source button bitmap content indicator indicates that the provided service request is valid.

By the provision of a method for handling a user input of a user of a finger-position sensitive HMI, which method is characterized by providing the detected force signal to a supervising element, the HMI OS generating a service request related to the displayed button and providing the service request to the supervising element, if the condition is fulfilled that the detected touch coordinates fit to the generated display location, observing a displayed button at the generated display location, generating an observed button bitmap content indicator of a pixel area related to the observed displayed button, providing the observed button bitmap content indicator to the supervising element, the HMI OS providing a source button bitmap content indicator of a bitmap of a button that was requested to be displayed at the generated display location, to the supervising element, the supervising element releasing the provided service request related to the displayed button, if the conditions are fulfilled that the detected force signal, provided to the supervising element, indicates that at least a predefined amount of pressure has been applied to the display, and a comparison of the provided observed button bitmap content indicator with the provided source button bitmap content indicator indicates that the provided service request is valid, it is provided the advantage to substantially avoid unwanted activations, for example by electromagnetic fields, of a service request related to a button displayed on the finger-position sensitive display of the HMI. Therefore, according to the present invention, a service request related to a button displayed on the finger-position sensitive display of the HMI is sufficiently reliable for safety-related requests. Accordingly, the present invention provides usability of a finger-position sensitive display of a finger-position sensitive HMI also for safety-related commands.

According to one embodiment, the method is comprising providing the detected force signal to the HMI OS, also, and the HMI OS generating the service request related to the displayed button and providing the service request to the supervising element, if the condition is also fulfilled that the detected force signal, provided to the HMI OS, indicates that at least a predefined amount of pressure has been applied to the display. Hereby it is provided an improvement of having a second channel by providing the detected force signal not only to the supervising element but also to the HMI OS, and by having the HMI OS generating the service request related to the displayed button and providing the service request to the supervising element, if the detected force signal, provided to the HMI OS, indicates that at least a predefined amount of pressure has been applied to the display. Thereby, it is provided the advantage that unwanted activations, for example by electromagnetic fields, of a service request related to a button displayed on the finger-position sensitive display of the HMI, are further reduced and can therefore be substantially completely avoided.

According to a further embodiment, the method is comprising providing the detected force signal to the supervising element without using the HMI OS. By providing the detected force signal to the supervising element without using the HMI OS, any unwanted impact on the reliability of the HMI OS, e.g. by a malware, has no impact on the detected force signal being provided to the supervising element without using the HMI OS. Thereby, it is provided the advantage that unwanted activations, for example by electromagnetic fields, of a service request related to a button displayed on the finger-position sensitive display of the HMI, are even further reduced. Accordingly, this embodiment further improves the usability of a finger-position sensitive display of a finger-position sensitive HMI for safety-related commands.

According to a further embodiment of the method, the detected force signal, provided to the supervising element, is a first force signal, and the method is comprising detecting a second force signal caused by, e.g. the same, pressure being applied to the display, and providing the detected second force signal to the HMI OS, and the HMI OS generating the service request related to the displayed button and providing the service request to the supervising element, if the condition is fulfilled that the detected second force signal, provided to the HMI OS, indicates that at least a predefined amount of pressure has been applied to the display. Hereby it is provided a further improvement of the advantageous aspect of having a second channel by, on the one hand, having a first and a second detected force signal, and by, on the other hand, providing the first detected force signal, preferably only, to the supervising element, and by providing the second detected force signal, preferably only, to the HMI OS. By detecting a first and a second force signal caused by, e.g. the same, pressure being applied to the display, any unwanted impact on the second force signal provided to the HMI OS, e.g. by an electromagnetic field, has no impact on the first detected force signal being provided to the supervising element, and vice versa. Thereby, it is provided the advantage that unwanted activations, for example by electromagnetic fields, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment, the method is comprising providing the detected first force signal to the supervising element through a first channel, and providing the detected second force signal to the HMI OS through a second channel, preferably first and second channel being operably and/or physically independent from each other. By providing the detected first force signal to the supervising element through a first channel, and providing the detected second force signal to the HMI OS through a second channel, any unwanted impact on the first channel, e.g. by an electromagnetic field, has no impact on the second channel, and vice versa. Thereby, it is provided the advantage that unwanted activations, for example by electromagnetic fields, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment of the method, the supervising element is using an operably and/or physically independent further EDPU. By having the supervising element using a further EDPU, the further EDPU being operably and/or physically independent from the EDPU normally running the HMI OS, any unwanted impact, e.g. by a malware or an electromagnetic field, on the EDPU running the HMI OS, has no impact on the EDPU run by the supervising element. Thereby, it is provided the advantage that unwanted activations, for example by a malware or an electromagnetic field, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment of the method, the supervising element is running an operably and/or physically independent further OS. By having the supervising element running a further OS, the further OS being operably and/or physically independent from the HMI OS, any unwanted impact, e.g. by a malware, on the HMI OS, has no impact on the OS of the supervising element. Thereby, it is provided the advantage that unwanted activations, for example by a malware, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment of the method, the source button bitmap content indicator comprises a source CRC value computed on the basis of a source bitmap of a button that was requested to be displayed at the generated display location. By using a source button bitmap content indicator comprising a CRC value computed on the basis of a source bitmap of a button that was requested to be displayed at the generated display location, an unwanted impact, e.g. by a malware or an electromagnetic field, on a result of the comparison of the observed button bitmap content indicator with the source button bitmap content indicator can be excluded. Thereby, it is provided the advantage that unwanted activations, for example by a malware or an electromagnetic field, of a service request related to a button displayed on the finger-position sensitive display of the HMI, are even further reduced. Accordingly, this embodiment even further improves the usability of a finger-position sensitive display of a finger-position sensitive HMI for safety-related commands.

According to the method of the present invention, the observed button bitmap content indicator comprises a DCIC, such as an observed CRC value, of a pixel area covering the observed displayed button. By using an observed button bitmap content indicator comprising a checksum like a DCIC of a pixel area related to the observed displayed button, an unwanted impact, e.g. by a malware or an electromagnetic field, on a result of the comparison of the observed button bitmap content indicator with the source button bitmap content indicator can be excluded. Thereby, it is provided the advantage that unwanted activations, for example by a malware or an electromagnetic field, of a service request related to a button displayed on the finger-position sensitive display of the HMI, are even further reduced. Accordingly, this embodiment even further improves the usability of a finger-position sensitive display of a finger-position sensitive HMI for safety-related commands.

According to a further embodiment of the method, observing a displayed button at the generated display location comprises extracting, for example by comprising physically connecting to a line carrying a video stream from the HMI OS to the display, video data from a generated output video stream on its way to the display and/or extracting video data at an input of the display. By extracting video data from a generated output video stream on its way to the display and/or by extracting video data at an input of the display, it is possible to directly observe video data of a video stream of a button on its was to the display. Therefore, a reliable and cost-efficient implementation of the present invention is provided. Accordingly, this embodiment even further improves the usability of a finger-position sensitive display of a finger-position sensitive HMI for safety-related commands.

According to a further embodiment of the method, detecting touch coordinates of a touched location on the display comprises detecting a finger location on a surface of the display by detecting a physical touch by the finger of a touch sensitive surface of the display. Hereby a simple, reliable and cost-efficient implementation of the present invention is provided.

According to a further embodiment of the method, detecting touch coordinates of a touched location on the display comprises detecting a finger location on a surface of the display by detecting an interference of the finger with an optical grid over the display. Hereby a simple, reliable and cost-efficient implementation of the present invention is provided.

According to a further embodiment of the method, detecting touch coordinates of a touched location on the display comprises detecting a finger location on a surface of the display by detecting a camera signal of a surface of the display. Hereby a simple, reliable and cost-efficient implementation of the present invention is provided.

According to a further embodiment of the method, the method comprises storing, preferably in a memory being connected to the EPDU, a graphical resource file containing a bitmap and button coordinates for the button to be generated by the HMI OS, providing, preferably by the display and/or preferably without using the HMI OS, the detected touch coordinates to the supervising element, providing, preferably by using the HMI OS, the graphical resource file both to the EPDU for generating the button, and to the supervising element, and the supervising element releasing the provided service request related to the displayed button, if the following conditions are also fulfilled: a comparison of the provided observed button bitmap content indicator with a reference button bitmap content indicator of the received graphical resource file indicates that the provided service request is valid, and a comparison of the provided coordinates of the button with the button coordinates contained in the received graphical resource file indicates that the provided service request is valid; the reference button bitmap content indicator preferably comprising a reference CRC value. The present embodiment further improves the method of the present invention since it provides the possibility to detect certain errors that may be generated within the HMI that embodiments without the additional mechanism of this embodiment may not detect.

According to a further embodiment of the method, the method comprises providing, preferably by using the supervising element, a reference time and/or a time stamp to the HMI OS, the HMI OS providing the reference time and/or the time stamp to the generated button to be displayed at the generated display location, observing, preferably by using a check unit, an observed reference time and/or an observed time stamp of the observed displayed button and providing the observed reference time and/or observed time stamp to the supervising element, and the supervising element releasing the provided service request related to the displayed button, if the following condition is also fulfilled: a comparison of the reference time and/or time stamp provided to the HMI OS with the observed reference time and/or observed time stamp indicates that the provided service request is valid. As already mentioned above, the present embodiment further improves the method of the present invention since it provides the possibility to detect certain errors that may be generated within the HMI that embodiments without the additional mechanism of this embodiment may not detect.

As to further advantages of the method of the second aspect of the invention and its embodiments, reference is also made to the corresponding aspects and embodiments of the first aspect of the invention described above.

The present invention also relates to a vehicle, such as a tipper, comprising a finger-position sensitive HMI for handling a user input of a user as described herein. The finger-position sensitive HMI may be installed permanently in the vehicle, or the finger-position sensitive HMI may be a separate unit, like a portable equipment.

The present invention also relates to a vehicle, such as a tipper, performing the steps of the method for handling a user input of a user of a finger-position sensitive HMI as described herein.

The present invention also relates to at least one computer program comprising program code means for performing the steps of the method for handling a user input of a user of a finger-position sensitive HMI as described herein, when said at least one program is run on at least one computer.

The present invention also relates to a computer readable medium carrying at least one computer program comprising program code means for performing the steps of the method for handling a user input of a user of a finger-position sensitive HMI as described herein, when said at least one program product is run on at least one computer.

The present invention also relates to a control unit for controlling a finger-position sensitive HMI, the HMI using an HMI OS and a finger-position sensitive display connected to the HMI OS, the control unit being configured to perform the steps of the method for handling a user input of a user of a finger-position sensitive HMI as described herein.

The present invention also relates to a vehicle, such as a tipper, comprising such a control unit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. Identical elements or elements with substantially identical function are provided with identical reference signs. Identical or similar principles apply for different embodiments unless described differently.

In the drawings.

DETAILED DESCRIPTION OF EXAMPLE EMBODIMENTS OF THE INVENTION

Figure 1:
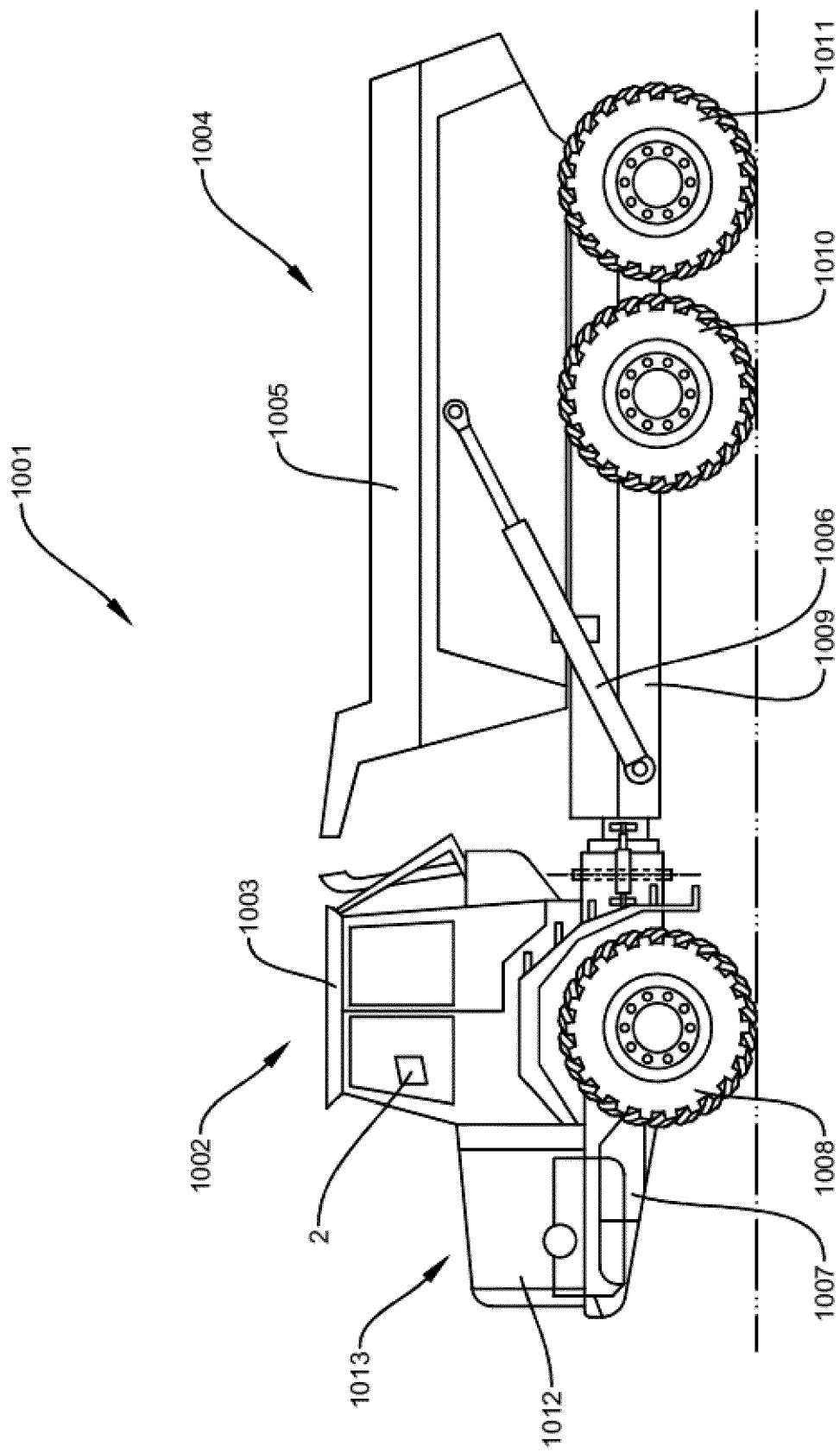
FIG. 1 is a side view of a tipper with a first exemplary embodiment of a finger-position sensitive HMI as described herein.

FIG. 1 is an illustration of a side view of a working machine 1001 in the form of a tipper The tipper 1001 has a front section 1002 with a cab 1003 for a driver and a rear section 1004 with a container 1005 for receiving a load. The container 1005 is pivotally connected to the rear section 1004 and tiltable by means of a pair of tilting cylinders 1006, for example hydraulic cylinders. The front section 1002 has a front frame 1007 and a pair of wheels 1008 suspended from the front frame 1007. The rear section 1004 has a rear frame 1009 and two pairs of wheels 1010, 1011 suspended from the rear frame 1009. The front section 1002 has a hood 1013 covering an engine compartment 1012.

A finger-position sensitive HMI 2 as described herein is provided in the cab 1003. The finger-position sensitive HMI 2 can be permanently installed in the tipper 1001, or can be a separate unit, like a portable equipment. For example the finger-position sensitive HMI 2 could be a wired/wirelessly connected but physically detached handheld device. The finger-position sensitive HMI 2 is provided for handling a user input of a user of the finger-position sensitive HMI 2. The user can for example by a driver of the tipper 1001. For using the finger-position sensitive HMI 2 the user can sit in the cab 1003. The user can for example use a finger for a user input to the finger-position sensitive HMI 2.

Figure 2:
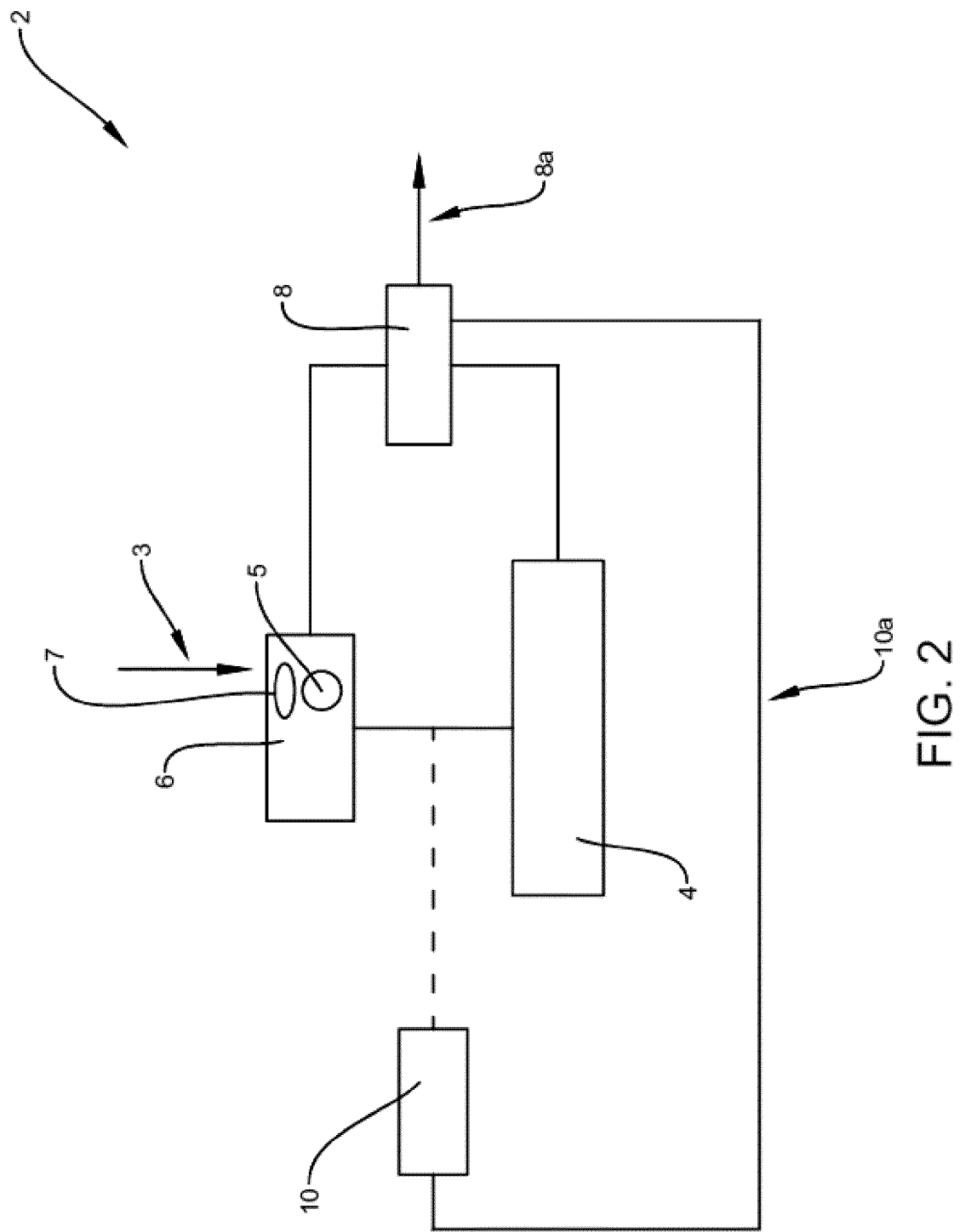
FIG. 2 is a schematical illustration of a first exemplary embodiment of a finger-position sensitive HMI as described herein.

FIG. 2 is a schematical illustration of a first exemplary embodiment of a finger-position sensitive HMI 2 for handling a user input 3 of a user, in particular for illustrating the general principle of the present invention. The HMI 2 of the embodiment of FIG. 2 comprises an EDPU 4. EDPU 4 is arranged to run an HMI OS. The HMI 2 comprises a finger-position sensitive display 6. The display 6 is connected to the EDPU 4. The HMI OS is arranged to generate a button 5. The HMI OS is arranged to generate a display location for the button 5 on the display 6. The HMI OS is arranged to request the display 6 to display the button 5 at the generated display location.

The display 6 is arranged to display the generated button 5 at the generated display location. The display 6 is arranged to detect touch coordinates of a touched location 7 on the display 6. The display 6 is arranged to provide the detected touch coordinates to the HMI OS. The display 6 is arranged to detect a force signal caused by pressure being applied to the display 6. The display 6 is connected to a supervising element 8. The display 6 is further arranged to provide the detected force signal to the supervising element 8. The EDPU 4 is connected to the supervising element 8. The HMI OS is further arranged to generate a service request related to the displayed button 5 and to provide the service request to the supervising element 8, if the condition is fulfilled that the detected touch coordinates fit to the generated display location. The HMI OS is further arranged to provide a source button bitmap content indicator of a bitmap of a button 5 that was requested to be displayed at the generated display location, to the supervising element 8.

The HMI 2 comprises a check unit 10. The check unit 10 is connected to the supervising element 8. The check unit 10 may also be connected to the EDPU 4. The check unit 10 is arranged to observe a displayed button 5 at the generated display location. The check unit 10 is arranged to generate an observed button bitmap content indicator of a pixel area related to the observed displayed button 5. The check unit 10 is arranged to provide the observed button bitmap content indicator to the supervising element 8, as symbolically indicated by line 10a.

The supervising element 8 is arranged to release, as symbolically indicated by line 8a, the provided service request related to the displayed button 5, if the conditions are fulfilled that the detected force signal, provided to the supervising element 8, indicates that at least a predefined amount of pressure has been applied to the display 6, and that a comparison of the provided observed button bitmap content indicator with the provided source button bitmap content indicator indicates that the provided service request is valid.

For example, the released service request 8a related to the displayed button 5 may be provided to a not shown control module of the tilting cylinders 1006 of the tiltable container 1005 of the tipper 1001, and may be a safety-related request or command 8a to tilt the container 1005.

Preferably, the predefined amount of pressure is selected in a way to have a value indicating that a finger of a human being has intentionally caused such amount of pressure.

The finger-position sensitive display 6 may comprise a vehicle mounted display of an ECU of a vehicle, for example an ECU of the tipper 1001 of FIG. 1.

The detected force signal may be provided to the HMI OS, also. The HMI OS may be further arranged to generate the service request related to the displayed button 5 and to provide the service request to the supervising element 8, if the condition is also fulfilled that the detected force signal, provided to the HMI OS, indicates that at least a predefined amount of pressure has been applied to the display 6.

Figure 3:
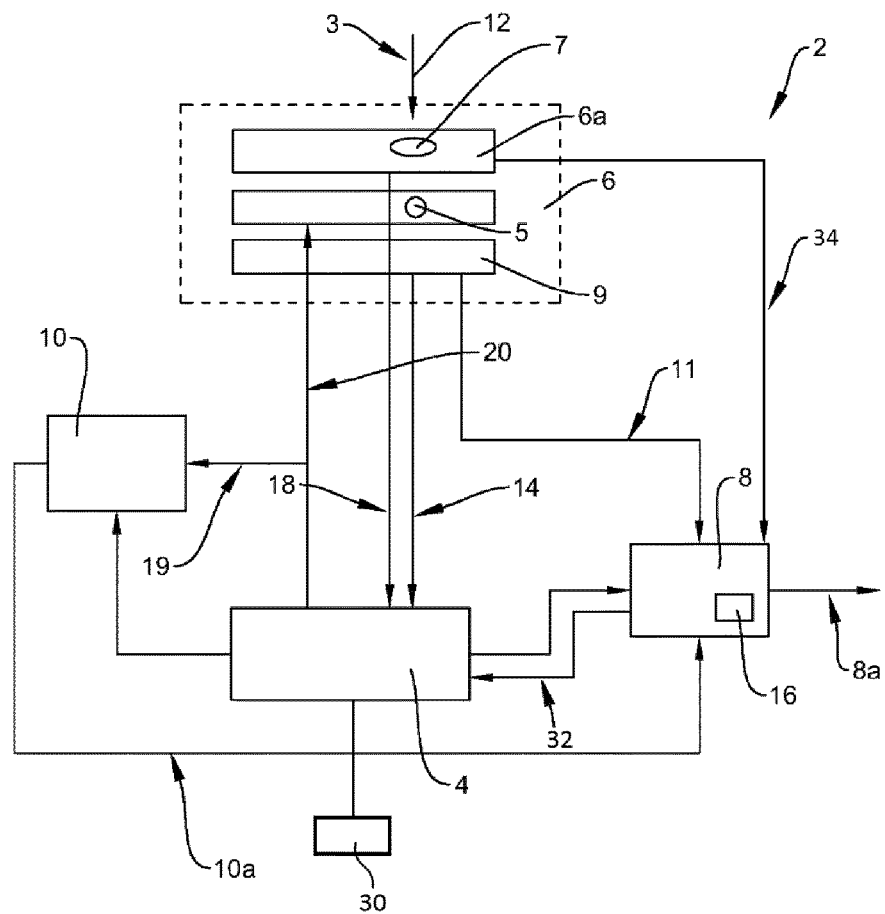
FIG. 3 is a schematical illustration of a second exemplary embodiment of a finger-position sensitive HMI as described herein.

FIG. 3 is a schematical illustration of a second exemplary embodiment of a finger-position sensitive HMI 2 for handling a user input 3 of a user. According to the second exemplary embodiment of FIG. 3, a first force signal is detected by a force sensor 9. The first force signal is caused by pressure being applied to the force sensor 9. The force sensor 9 is part of the display 6. The display 6 is arranged, for example by having a respective first interface, to provide the first force signal to the supervising element 8 through a first channel 11 being independent from the HMI OS running on the EDPU 4. The supervising element 8 may be any kind of computer. The supervising element 8 may also be part of an instrument cluster of an ECU of a vehicle, like a tipper 1001.

The display 6 is further arranged to detect a second force signal by the force sensor 9. The second force signal is caused by pressure being applied to the force sensor 9. The pressure causing the second force signal may be the same as the pressure causing the first force signal. The display 6 is arranged, for example by having a respective second interface, to provide the second force signal to the HMI OS running on the EDPU 4. The HMI OS is further arranged to generate the service request related to the displayed button 5 and to provide the service request to the supervising element 8, if the condition is also fulfilled that the detected second force signal, provided to the HMI OS, indicates that at least a predefined amount of pressure has been applied to the display 6.

The display 6 is further arranged to provide the detected second force signal to the HMI OS through a second channel 14. First channel 11 and second channel 14 are operably and physically independent from each other.

The supervising element 8 comprises an operably and physically independent further EDPU 16. The supervising element 8 comprises an operably and physically independent further OS running on the EDPU 16. Although the further OS of the supervising element 8 is operably and physically independent from the HMI OS, the further OS of the supervising element 8 may be of the same brand. This means that the EDPU 4 may run for example Android as the HMI OS, and the supervising element 8 may run another Android as an operably and physically independent further OS running on the operably and physically independent further EDPU 16.

The source button bitmap content indicator may comprise a source CRC value. The source CRC value may be computed on the basis of a source bitmap of a button 5 that was requested to be displayed at the generated display location.

The observed button bitmap content indicator may comprise a DCIC, such as a observed CRC value, of a pixel area related to, for example covering, the observed displayed button 5.

The display 6 is arranged to detect touch coordinates of a touched location 7 on the display 6 by comprising a touch sensitive surface 6a detecting a physical touch 12 of a finger. The detected touch coordinates are provided to the EPU 4 running the HMI OS on a channel 18.

The display 6 may alternatively or additionally be arranged to detect touch coordinates of a touched location 7 on the display 6 by comprising an optical grid over the display 6, the optical grid detecting a finger location on a surface of the display 6.

The display 6 may alternatively or additionally be arranged to detect touch coordinates of a touched location 7 on the display 6 by comprising a camera, detecting a finger location on a surface of the display 6.

The check unit 10 is arranged to observe a displayed button 5 at the generated display location by extracting video data, as indicated by arrow 19, from a generated output video stream 20 on its way from the EDPU 4 to the display 6. The check unit 10 is physically connected to a line carrying the video stream 20 from the HMI OS to the display 6.

Alternatively or additionally the check unit 10 may be arranged to observe a displayed button 5 at the generated display location by extracting video data at an input of the display 6.

The HMI 2 further comprises a memory 30 being connected to the EDPU 4. In the memory 30 it is stored a graphical resource file containing a bitmap and button coordinates for the button 5 to be generated by the HMI OS. The display 6 being further arranged to provide the detected touch coordinates to the supervising element 8. Preferably the display 6 being arranged to provide the detected touch coordinates on the surface 6a to the supervising element 8 through a channel 34, the channel 34 being preferably operably and/or physically independent from the HMI OS. The HMI OS being further arranged to provide the graphical resource file both to the EPDU 4 for generating the button 5, and to the supervising element 8. The supervising element 8 being further arranged to release the provided service request related to the displayed button 5, if the following conditions are also fulfilled: a comparison of the provided observed button bitmap content indicator with a reference button bitmap content indicator of the received graphical resource file indicates that the provided service request is valid, and a comparison of the provided coordinates of the button 5 with the button coordinates contained in the received graphical resource file indicates that the provided service request is valid. The reference button bitmap content indicator preferably comprising a reference CRC value.

The supervising element 8 is further arranged to provide a reference time and/or a time stamp to the HMI OS according to arrow 32. The HMI OS being further arranged to provide the reference time and/or the time stamp to the generated button 5 to be displayed at the generated display location. The check unit 10 being further arranged to observe at location 19 an observed reference time and/or an observed time stamp of the observed displayed button 5 and to provide the observed reference time and/or observed time stamp to the supervising element 8 via connection 10a. The supervising element 8 being further arranged to release, according to arrow 8a, the provided service request related to the displayed button 5, if the following condition is also fulfilled: a comparison of the reference time and/or time stamp provided to the HMI OS with the observed reference time and/or observed time stamp indicates that the provided service request is valid.

Figure 4:
FIG. 4 is a flow chart of an exemplary embodiment of a method for handling a user input of a user of a finger-position sensitive HMI as described herein.

FIG. 4 is a flow chart of an exemplary embodiment of a method for handling a user input of a user of a finger-position sensitive HMI 2. The finger-position sensitive HMI 2 preferably being finger-position sensitive HMI 2 of the second embodiment described above, the finger-position sensitive HMI 2 comprising an EDPU 4 arranged to run an HMI OS and comprising a finger-position sensitive display 6 connected to the EDPU 4.

The method of FIG. 4 comprises the step 2000 of generating a button 5. The method further comprises the step 2002 of generating a display location for the button 5 on the display 6. The method further comprises the step 2004 of displaying the generated button 5 on the display 6 at the generated display location. The method further comprises the step 2006 of detecting touch coordinates of a touched location 7 on the finger-position sensitive display 6. The method further comprises the step 2008 of providing the detected touch coordinates to the HMI OS. The method further comprises the step 2010 of detecting a force signal caused by pressure being applied to the display 6.

The method further comprises the step 2012 of providing the detected force signal to a supervising element 8. The method further comprises the step 2014 of the HMI OS generating a service request related to the displayed button 5 and providing the service request to the supervising element 8, if the condition is fulfilled that the detected touch coordinates fit to the generated display location. The method further comprises the step 2016 of observing a displayed button 5 at the generated display location. The method further comprises the step 2018 of generating an observed button bitmap content indicator of a pixel area related to the observed displayed button 5. The method further comprises the step 2020 of providing the observed button bitmap content indicator to the supervising element 8. The method further comprises the step 2022 of the HMI OS providing a source button bitmap content indicator of a bitmap of a button 5 that was requested to be displayed at the generated display location, to the supervising element 8.

The method further comprises the step 2024 of the supervising element 8 releasing the provided service request related to the displayed button 5, if the conditions are fulfilled that the detected force signal, provided to the supervising element 8, indicates that at least a predefined amount of pressure has been applied to the display 6, and that a comparison of the provided observed button bitmap content indicator with the provided source button bitmap content indicator indicates that the provided service request is valid.

Preferably, the method comprises providing the detected force signal to the HMI OS, also, and the HMI OS generating the service request related to the displayed button 5 and providing the service request to the supervising element 8, if the condition is also fulfilled that the detected force signal, provided to the HMI OS, indicates that at least a predefined amount of pressure has been applied to the display 6.

Preferably, the method comprises providing the detected force signal to the supervising element 8 without using the HMI OS.

Preferably, for use in the method, the detected force signal, provided to the supervising element 8, is a first force signal, and the method comprises detecting a second force signal caused by, e.g. the same, pressure being applied to the display 6, and comprises providing the detected second force signal to the HMI OS, and comprises the HMI OS generating the service request related to the displayed button 5 and providing the service request to the supervising element 8, if the condition is fulfilled that the detected second force signal, provided to the HMI OS, indicates that at least a predefined amount of pressure has been applied to the display 6.

Preferably, the method comprises providing the detected first force signal to the supervising element 8 through a first channel, and comprises providing the detected second force signal to the HMI OS through a second channel. Preferably first and second channel being operably and/or physically independent from each other.

Preferably, when executing the method, the supervising element 8 is using an operably and/or physically independent further EDPU.

Preferably, when executing the method, the supervising element 8 is running an operably and/or physically independent further OS.

Preferably, when executing the method, the source button bitmap content indicator comprises a source CRC value computed on the basis of a source bitmap of a button 5 that was requested to be displayed at the generated display location.

Preferably, when executing the method, the observed button bitmap content indicator comprises a DCIC, such as an observed CRC value, of a pixel area related to, for example covering, the observed displayed button 5.

Preferably, when executing the method, observing a displayed button 5 at the generated display location comprises extracting, for example by comprising physically connecting to a line carrying a video stream from the HMI OS to the display 6, video data from a generated output video stream on its way to the display 6.

Preferably, when executing the method, observing a displayed button 5 at the generated display location comprises extracting video data at an input of the display 6.

Preferably, when executing the method, detecting touch coordinates of a touched location 7 on the display 6 comprises detecting a finger location on a surface of the display 6 by detecting a physical touch by the finger of a touch sensitive surface of the display 6.

Preferably, when executing the method, detecting touch coordinates of a touched location 7 on the display 6 comprises detecting a finger location on a surface of the display 6 by detecting an interference of the finger with an optical grid over the display 6.

Preferably, when executing the method, detecting touch coordinates of a touched location 7 on the display 6 comprises detecting a finger location on a surface of the display 6 by detecting a camera signal of a surface of the display 6.

Preferably, the method comprises storing, preferably in a memory 30 being connected to the EPDU 4, a graphical resource file containing a bitmap and button coordinates for the button 5 to be generated by the HMI OS, providing, preferably by the display 6 and/or preferably without using the HMI OS, the detected touch coordinates to the supervising element 8, providing, preferably by using the HMI OS, the graphical resource file both to the EPDU 4 for generating the button 5, and to the supervising element 8, and the supervising element 8 releasing the provided service request related to the displayed button 5, if the following conditions are also fulfilled: a comparison of the provided observed button bitmap content indicator with a reference button bitmap content indicator of the received graphical resource file indicates that the provided service request is valid, and a comparison of the provided coordinates of the button 5 with the button coordinates contained in the received graphical resource file indicates that the provided service request is valid. The reference button bitmap content indicator preferably comprising a reference CRC value.

Preferably, the method comprises providing, preferably by using the supervising element 8, a reference time and/or a time stamp to the HMI OS, preferably according to arrow 32, the HMI OS providing the reference time and/or the time stamp to the generated button 5 to be displayed at the generated display location, observing, preferably by using a check unit 10, an observed reference time and/or an observed time stamp of the observed displayed button 5 and providing the observed reference time and/or observed time stamp to the supervising element 8, and the supervising element 8 releasing the provided service request related to the displayed button 5, if the following condition is also fulfilled:

a comparison of the reference time and/or time stamp provided to the HMI OS with the observed reference time and/or observed time stamp indicates that the provided service request is valid.

Preferably, when executing the method, at least one computer program may be used, the at least one computer program comprising program code means for performing the steps of the method as described herein when said at least one program is run on at least one computer.

A computer readable medium can be provided, the computer readable medium carrying at least one computer program comprising program code means for performing the steps of of the method as described herein when said at least one program product is run on at least one computer.

A control unit can be provided for controlling a finger-position sensitive HMI 2, the HMI 2 using an HMI OS and a finger-position sensitive display 6 connected to the HMI OS, the control unit being configured to perform the steps of the method as described herein.

It is to be understood that the present invention is not limited to the embodiments described above and illustrated in the drawings; rather, the skilled person will recognize that many changes and modifications may be made within the scope of the appended claims.

The invention claimed is:

1. A finger-position sensitive HMI, Human Machine Interface, for handling a user input of a user, the HMI comprising an EDPU, Electronic Data Processing Unit, arranged to run an HMI OS, Human Machine Interface Operating System, and comprising a finger-position sensitive display connected to the EDPU,
the HMI OS being arranged to generate a button and a display location for the button on the display, and to request the display to display the button at the generated display location,
the display being arranged
to display the generated button at the generated display location,
to detect touch coordinates of a touched location on the display,
to provide the detected touch coordinates to the HMI OS,
and to detect a force signal caused by pressure being applied to the display, characterized by:
the display being connected to a supervising element and being further arranged to provide the detected force signal to the supervising element,
the EDPU being connected to the supervising element and the HMI OS being further arranged
to generate a service request related to the displayed button and to provide the service request to the supervising element, if the following condition is fulfilled:
the detected touch coordinates fit to the generated display location,
and to provide a source button bitmap content indicator of a bitmap of the button that was requested to be displayed at the generated display location, to the supervising element, a button bitmap content indicator being an indicator which indicates one or more characteristics of a content of a bitmap of a button,
a check unit being connected to the supervising element and being arranged to observe a displayed button at the generated display location,
to generate an observed button bitmap content indicator of a pixel area related to the observed displayed button,
and to provide the observed button bitmap content indicator to the supervising element,
the supervising element being arranged to release the provided service request related to the displayed button, if the following conditions are fulfilled:
the detected force signal, provided to the supervising element, indicates that at least a predefined amount of pressure has been applied to the display, and
a comparison of the provided observed button bitmap content indicator with the provided source button bitmap content indicator indicates that the provided service request is valid,
the observed button bitmap content indicator comprised a DCID, Display Content Integrity Checker, of a pixel area covering the observed displayed button.

2. The interface of claim 1, wherein the detected force signal is provided to the HMI OS, also, and the HMI OS being further arranged to generate the service request related to the displayed button and to provide the service request to the supervising element, if the following condition is also fulfilled:
the detected force signal, provided to the HMI OS, indicates that at least a predefined amount of pressure has been applied to the display.

3. The interface of claim 1, wherein the display being arranged to provide the detected force signal to the supervising element through a channel being, preferably operably and/or physically, independent from the HMI OS.

4. The interface of claim 1, wherein the detected force signal, provided to the supervising element, is a first force signal, and wherein the display being further arranged to detect a second force signal caused by, e.g. the same, pressure being applied to the display, and wherein the detected second force signal is provided to the HMI OS, and the HMI OS being further arranged to generate the service request related to the displayed button and to provide the service request to the supervising element, if the following condition is also fulfilled:
the detected second force signal, provided to the HMI OS, indicates that at least a predefined amount of pressure has been applied to the display.

5. The interface of claim 4, wherein the display being arranged to provide the detected first force signal to the supervising element through a first channel, and to provide the detected second force signal to the HMI OS through a second channel, preferably first and second channel being operably and/or physically independent from each other.

6. The interface of claim 1, wherein the supervising element comprises an operably and/or physically independent further EDPU, and/or comprises an operably and/or physically independent further OS, Operating System.

7. The interface of claim 1, wherein the finger-position sensitive display comprises a vehicle mounted display of an ECU, Electronic Control Unit, of a vehicle, such as a tipper.

8. The interface of claim 1, wherein
the source button bitmap content indicator comprises a source CRC, Cyclic Redundancy Check, value computed on the basis of a source bitmap of a button that was requested to be displayed at the generated display location.

9. The interface of claim 1, wherein the display is arranged to detect touch coordinates of a touched location on the display by comprising
a touch sensitive surface detecting a physical touch of a finger, and/or
an optical grid over the display, the optical grid detecting a finger location on a surface of the display, and/or
a camera, detecting a finger location on a surface of the display.

10. The interface of claim 1, comprising a memory being connected to the EDPU, the memory having stored a graphical resource file containing a bitmap and button coordinates for the button to be generated by the HMI OS, the display being further arranged to provide the detected touch coordinates to the supervising element,
preferably the display being arranged to provide the detected touch coordinates to the supervising element through a channel being, preferably operably and/or physically, independent from the HMI OS,
the HMI OS being further arranged to provide the graphical resource file both to the EPDU for generating the button, and to the supervising element,
the supervising element being further arranged to release the provided service request related to the displayed button, if the following conditions are also fulfilled:
a comparison of the provided observed button bitmap content indicator with a reference button bitmap content indicator of the received graphical resource file indicates that the provided service request is valid, and
a comparison of the provided coordinates of the button with the button coordinates contained in the received graphical resource file indicates that the provided service request is valid;
the reference button bitmap content indicator preferably comprising a reference CRC value.

11. The interface of claim 1, wherein
the supervising element being further arranged to provide a reference time and/or a time stamp to the HMI OS,
the HMI OS being further arranged to provide the reference time and/or the time stamp to the generated button to be displayed at the generated display location,
the check unit being further arranged to observe an observed reference time and/or an observed time stamp of the observed displayed button and to provide the observed reference time and/or observed time stamp to the supervising element, and
the supervising element being further arranged to release the provided service request related to the displayed button, if the following condition is also fulfilled:
a comparison of the reference time and/or time stamp provided to the HMI OS with the observed reference time and/or observed time stamp indicates that the provided service request is valid.

12. A vehicle, such as a tipper, comprising an interface according to claim 1, the interface being permanently installed in the vehicle, or being a separate unit, like a portable equipment.

13. A method for handling a user input of a user of a finger-position sensitive HMI, the HMI comprising an EDPU arranged to run an HMI OS, such as Android, and comprising a finger-position sensitive display connected to the EDPU, the method comprising the steps of:
generating a button and generating a display location for the button on the display, and requesting the display to display the button at the generated display location,
displaying the generated button on the display at the generated display location,
detecting touch coordinates of a touched location on the finger-position sensitive display, and providing the detected touch coordinates to the HMI OS,
detecting a force signal caused by pressure being applied to the display, characterized by:
the display providing the detected force signal to a supervising element connected to the display,
the HMI OS generating a service request related to the displayed button and providing the service request to the supervising element, if the following condition is fulfilled:
the detected touch coordinates fit to the generated display location,
observing a displayed button at the generated display location,
generating an observed button bitmap content indicator of a pixel area related to the observed displayed button,
providing the observed button bitmap content indicator to the supervising element,
the HMI OS providing a source button bitmap content indicator of a bitmap of the button that was requested to be displayed at the generated display location, to the supervising element,
the supervising element releasing the provided service request related to the displayed button, if the following conditions are fulfilled:
the detected force signal, provided to the supervising element, indicates that at least a predefined amount of pressure has been applied to the display, and
a comparison of the provided observed button bitmap content indicator with the provided source button bitmap content indicator indicates that the provided service request is valid,
the observed button bitmap content indicator comprises a DCIC of a pixel area covering the observed displayed button.

14. The method of claim 13, the method comprising providing the detected force signal to the HMI OS, also, and the HMI OS generating the service request related to the displayed button and providing the service request to the supervising element, if the following condition is also fulfilled:
the detected force signal, provided to the HMI OS, indicates that at least a predefined amount of pressure has been applied to the display.

15. The method of claim 13, comprising providing the detected force signal to the supervising element without using the HMI OS.

16. The method of claim 13, wherein the detected force signal, provided to the supervising element, is a first force signal, and the method comprising detecting a second force signal caused by, e.g. the same, pressure being applied to the display, and providing the detected second force signal to the HMI OS, and the HMI OS generating the service request related to the displayed button and providing the service request to the supervising element, if the following condition is fulfilled:

the detected second force signal, provided to the HMI OS, indicates that at least a predefined amount of pressure has been applied to the display.

17. The method of claim 16, comprising providing the detected first force signal to the supervising element through a first channel, and providing the detected second force signal to the HMI OS through a second channel, preferably first and second channel being operably and/or physically independent from each other.

18. The method of claim 13, the supervising element using an operably and/or physically independent further EDPU, and/or running an operably and/or physically independent further OS.

19. The method of claim 13, wherein the source button bitmap content indicator comprises a source CRC value computed on the basis of a source bitmap of a button that was requested to be displayed at the generated display location.

20. The method of claim 13, wherein detecting touch coordinates of a touched location on the display comprises detecting a finger location on a surface of the display by detecting a physical touch by the finger of a touch sensitive surface of the display, and/or
an interference of the finger with an optical grid over the display, and/or
a camera signal of a surface of the display.

21. The method of claim 13, comprising
storing, preferably in a memory being connected to the EPDU, a graphical resource file containing a bitmap and button coordinates for the button to be generated by the HMI OS,
providing, preferably by the display and/or preferably without using the HMI OS, the detected touch coordinates to the supervising element,
providing, preferably by using the HMI OS, the graphical resource file both to the EPDU for generating the button, and to the supervising element, and
the supervising element releasing the provided service request related to the displayed button, if the following condition is also fulfilled:

a comparison of the provided observed button bitmap content indicator with a reference button bitmap content indicator of the received graphical resource file indicates that the provided service request is valid, and
a comparison of the provided coordinates of the button with the button coordinates contained in the received graphical resource file indicates that the provided service request is valid;

the reference button bitmap content indicator preferably comprising a reference CRC value.

22. The method of claim 13, wherein
Providing, preferably by using the supervising element, a reference time and/or a time stamp to the HMI OS,
the HMI OS providing the reference time and/or the time stamp to the generated button to be displayed at the generated display location,
observing, preferably by using a check unit, an observed reference time and/or an observed time stamp of the observed displayed button and providing the observed reference time and/or observed time stamp to the supervising element, and
the supervising element releasing the provided service request related to the displayed button, if the following condition is also fulfilled:

a comparison of the reference time and/or time stamp provided to the HMI OS with the observed reference time and/or observed time stamp indicates that the provided service request is valid.

23. At least one non-transitory computer program comprising program code means for performing the steps of claim 13 when said at least one program is run on at least one computer.

24. A non-transitory computer readable medium carrying at least one computer program comprising program code means for performing the steps of claim 13 when said at least one program product is run on at least one computer.

25. A control unit for controlling a finger-position sensitive HMI, the HMI using an HMI OS and a finger-position sensitive display connected to the HMI OS, the control unit being configured to perform the steps of the method according to claim 13.

* * * * *